United States Patent [19]
Stepan

[11] Patent Number: 5,438,753
[45] Date of Patent: Aug. 8, 1995

[54] PROCESS AND APPARATUS FOR CUTTING THROUGH A CABLE SHEATHING OF FIBRES

[76] Inventor: Jiri Stepan, St. Gallerstrasse 76, CH-7320 Sargans, Czechoslovakia

[21] Appl. No.: 971,188

[22] Filed: Nov. 12, 1992

[30] Foreign Application Priority Data

Nov. 12, 1991 [CH] Switzerland ............... 3295/91

[51] Int. Cl.⁶ .................. H01R 43/00; H02G 1/12
[52] U.S. Cl. ......................... 29/868; 30/124; 30/90.1; 81/9.51
[58] Field of Search ............... 30/90.1, 90.4, 90.6, 30/90.7, 90.8, 180, 182, 124, 133; 81/9.51, 9.41; 29/564.6, 566.1, 868; 83/100, 402, 947

[56] References Cited

U.S. PATENT DOCUMENTS

| | | | |
|---|---|---|---|
| 4,019,409 | 4/1977 | McKeever | 81/9.51 |
| 4,715,251 | 12/1987 | Margolin et al. | 81/9.4 |
| 4,763,410 | 8/1988 | Schwartzman | 29/828 |

FOREIGN PATENT DOCUMENTS

| | | | |
|---|---|---|---|
| 0430868 | 10/1990 | European Pat. Off. | |
| 0096165 | 2/1979 | German Dem. Rep. | 30/182 |
| 2031066 | 1/1971 | Germany | 30/182 |
| 1280427 | 7/1972 | United Kingdom | |
| 2099237 | 5/1981 | United Kingdom | |

*Primary Examiner*—Hwei Siu Payer
*Attorney, Agent, or Firm*—Ostrolenk, Faber, Gerb & Soffen

[57] ABSTRACT

The invention relates to a process and an apparatus for cutting through a cable sheathing of fibres, in particular Kevlar (Trademark) fibres. A cutting apparatus has several, preferably concentric, cutting zones along the circumference of the cable, for example defined by a cutting die and an anvil, the cutting die and anvil preferably having a lateral recess for lateral insertion of a cable, and being pressed and/or hammered against one another in such a way that the fibres which are held in between are cut. An air stream in a suction pipe ensures the positioning of the fibres between the cutting die and the anvil. The invention permits rapid and reliable cutting of sheathing fibres.

26 Claims, 2 Drawing Sheets

PROCESS AND APPARATUS FOR CUTTING THROUGH A CABLE SHEATHING OF FIBRES

BACKGROUND OF THE INVENTION

The invention relates to a process for cutting through a cable sheathing of fibres with a blade, in which the fibres are brought into a cutting position projecting approximately radially from the cable, and an apparatus for cutting through a cable sheathing of fibres in which the fibres can be brought into a cutting position projecting at least approximately radially from the cable.

Particularly in fibre-optical cables (optical waveguides), a pull relief of KEVLAR (a trademark of DU PONT) fibres or similar fibres having a high tensile strength are frequently provided. In the stripping of such fibre-optical cables, it is therefore also necessary to cut through this fibre layer. The fibres presently used are distinguished by high tensile strength. They are therefore difficult to cut. Conventional stripping apparatuses, for example having stationary V-knives or rotating stripping knives, can therefore be used only with difficulty in most cases for stripping such cables. The safest practical stripping method available today for Kevlar fibres is manual cutting with special scissors.

However, certain machines and apparatuses which are used in particular in an air stream for orienting the fibres in a required direction in order then to cut through the fibres positioned in this manner, by means of, for example, scissors (cf. JP-A-64-3607) or by means of rotating saw blades (cf. DE-A-3925850), have also been developed, in such cases the fibres frequently additionally having to be kept in a fixed position by means of clamping jaws. In all these known apparatuses, an irregular cut is obtained over the circumference of the cable sheathing, because the fibres are pulled in one direction (roughly at right angles to the surface of the sheathing) practically over the entire circumference.

DE-A 3831175 also describes a stripping means having a suction air stream, a suction pipe for receiving the cable being designed in two parts there as a particular embodiment. This can lead to poorly defined cutting of the fibres if fibres in the sheathing are jammed in the suction pipe when the latter is closed and therefore cannot be gripped by the cutting means.

For better understanding, reference is being made here to FIG. 7, which illustrates the prior art. There, the cut fibre ends remaining on the cable sheathing are of very nonuniform length. The fibre ends 30 coming from the right-hand part of the cable 31 have a length of about X2 while the fibre ends 30 coming from the left-hand cable part are only Y2 long. The ratio X2 to Y2 has a high value. In many cases, this is an obstacle in the event of further processing of the cable ends.

Fairly uniform cuts can be achieved by means of apparatuses corresponding to US-A-4914986 or DE-A-3842754. The latter describes a type of saw shearing apparatus which was developed by the applicant and is also capable of cutting a fibrous sheathing all around. However, the mechanical capacity of such an apparatus is relatively great, and at least two separate drives are required. In addition, particularly thin fibres can be relatively easily jammed between the shearing elements, which may lead to a malfunction.

The arrangement described in U.S. Pat. No. 4,914,986 is completely unsuitable for thin fibrous material. This apparatus functions only in the case of braided copper or steel sheaths. In addition, this apparatus too involves a not inconsiderable expense, especially since several components—including radially acting clamping apparatuses—have to be driven.

SUMMARY OF THE INVENTION

It is now the object of the invention to develop a process and an apparatus by means of which the fibres of fibre-optical cable sheathings can be cut through particularly rapidly and reliably. The apparatus should not have any of the above-mentioned disadvantages. It should consist of few components and ensure cutting lengths which are as uniform as possible at the cut fibre ends.

The objects are achieved satisfactorily for the first time by the process or the apparatus according to the invention.

Cutting of the fibres at only two points along the cable circumference surprisingly showed that the length differences of the remaining fibre ends were substantially reduced. In comparison with manual cutting of the fibres, only a small fraction of the time is required. Moreover, the apparatus according to the invention can be made small and integrated.

The cooperation of a "cutting die" according to the invention with an anvil leads to good cutting results, and the fibres can be oriented by means of the air stream as far as possible uniformly along the circumference of the sheathing and the cut lengths are thus uniform. Furthermore, the cut-off fibres are carried away by the air stream. The air stream usefully ends in a filter bag. It can be generated, for example, by a conventional vacuum cleaner.

Cutting of the fibres themselves is carried out by cutting or pinching off the fibres at the edge of the "cutting die". The said edge may be both pointed and slightly rounded. The anvil and the cutting die are preferably formed from tungsten carbide. For the purposes of the invention, however, there are also variants in which the anvil is formed from relatively soft or resilient material, for example a copper alloy, hard rubber or the like.

A cutting operation may be characterised in that the fibres are positioned—in particular by means of an air stream—in such a way that they are distributed at least in a region of not less than 50°, preferably in at least two regions to the sides of the recess over not less than 100°, more preferably over not less than 180°, of the circumference of the cable. The cutting energy is supplied mainly via at least this region or these regions of the circumference, after which the cut-off fibre ends are optionally transported away by the air stream. This operation results in a clean cut surface at the cut points of the fibres, in particular through preliminary fixing of the fibres before the actual cutting, since the said fibres can no longer slip, as often happened earlier in the case of conventional shears.

Since fibre-optical cables in particular frequently have an innate curvature, insertion of the cable into a central insertion orifice according to the invention is sometimes difficult. Particularly for these cases, the apparatus variant according to the invention and having a laterally slotted cutting apparatus can advantageously be used since in such an apparatus the cables to be stripped can be inserted laterally into the cutting die and anvil. It is an advantage, if the cutting zones or at least one of the blades is formed at least partly concentrically, for example U-shaped, relative to the cable, the cutting apparatus preferably having at least one anvil and/or one cutting die and a pressure and/or impact drive are provided for supplying the cutting energy. It is practical when the cutting apparatus is housed within a suction pipe which is formed—preferably by at least one air guide—in such a way that, by means of an optionally divided air stream the fibres can be positioned over at least two regions of at least 60° each or at least one region of at least 150°, preferably 180° or optionally 360°, around the circumference of the cable sheath, approximately at right angles to its surface. The apparatus variant having a 360 degree spread of the fibres permits in theory the maximum possible uniformity of the cut lengths of the fibre ends, but the cable to be stripped must be inserted axially into a bore.

Other advantages are given when a suction pipe, the anvil and the cutting die each have a congruent, slot-like, optionally V-shaped insertion orifice which runs in the axial direction of a cable and is preferably connected to an axial, bore-like insertion orifice, the cutting die preferably itself being U-shaped.

If the insertion orifice is V-shaped, it is also possible to automate the insertion process since the cable to be stripped is optimally guided into the required position as a result of the V-shape.

A fluid or hydraulic impact drive is particularly compact and permits rapid application of the required compressive or impact force for cutting through fibres. To ensure that all fibres are cut through, one or more impacts of the hammer are envisaged, depending on the fibre cross-section.

The preferred embodiment of the blade also increases its life.

A lateral orifice in the cutting apparatus permits lateral insertion of a cable and hence the use of a laterally pivoting manipulator arm having clamping jaws for clamping the cable, which contributes towards automation and therefore further acceleration of the stripping operation.

In this connection, reference is made to the U.S. patent application Ser. No. 07/975,263, now U.S. Pat. No. 5,361,384 which was submitted on the same date and is regarded as being completely disclosed for the purposes of this patent application.

The apparatus according to the invention is preferably used in conjunction with the further stripping apparatuses or stripping stations described in the '263 patent application.

The invention can be particularly advantageously used if the pneumatic drive is operated under computer control, optionally together with the manipulator. An optimal stripping speed can thus be achieved.

The invention is illustrated in detail by way of example with reference to drawings. In addition, further inventive details and variants are evident from the description of the drawings.

DETAILED DESCRIPTION

Figure 5:
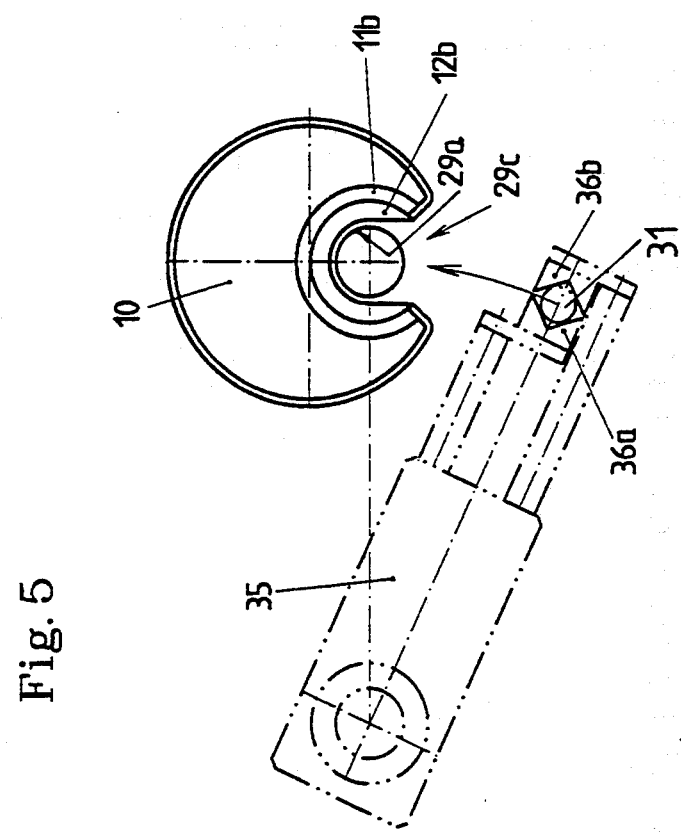
FIG. 5 shows a view of the apparatus from FIG. 1 in association with a pivotable manipulator arm.

The Figures are described in association and in general. Identical components are given identical reference symbols and similar components are given identical reference symbols with different indices.

Referring first to FIGS. 1–6, a suction pipe 27b in which an air stream 33 is drawn by a suction means which is not shown is provided in all variants of the invention. At least one air guide 4c1, 4c2 serves for guiding the air stream 33, in particular in the region of the fibres 30 to be cut. A cutting die 12b is located coaxially with an anvil 13b. The blade which has blade regions 34a, 34b, of the cutting die 12b is a distance away from the surface of the anvil 13b in the starting position. In this position, the cable 31 to be stripped is inserted (see FIG. 5). By means of the air stream 33, the fibres 30 are oriented so that they intersect imaginary connecting lines between the anvil 13b and the blade 34b of the cutting die 12b. In the cutting position (FIGS. 1 and 4), the blade of the cutting die 12b is pressed and/or hammered onto the surface of the anvil 13b. The blade regions 34a, 34b of the "cutting die" 12b, thus cut through the fibres 30 at two different points. The cut-off fibre ends are transported away by the air stream 33 and, if required, collected in a paper bag.

Figure 1:
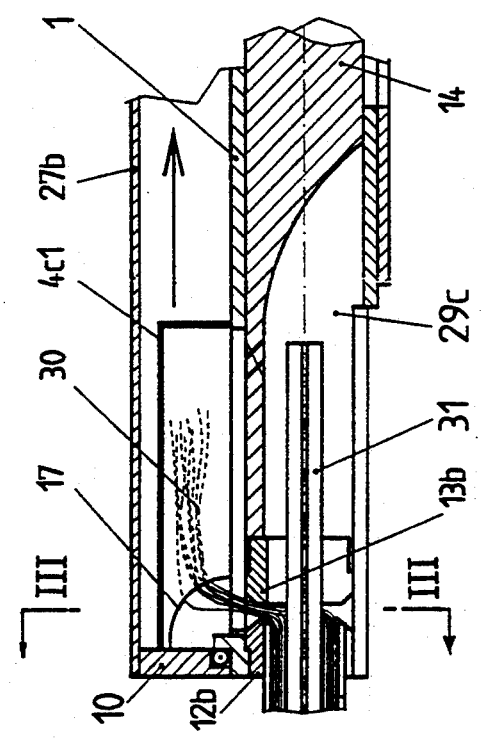
FIG. 1 shows a diagram of a preferred variant having a lateral insertion slot for the cable, as a section along the line I—I in FIG. 3, in a closed state.
Figure 2:
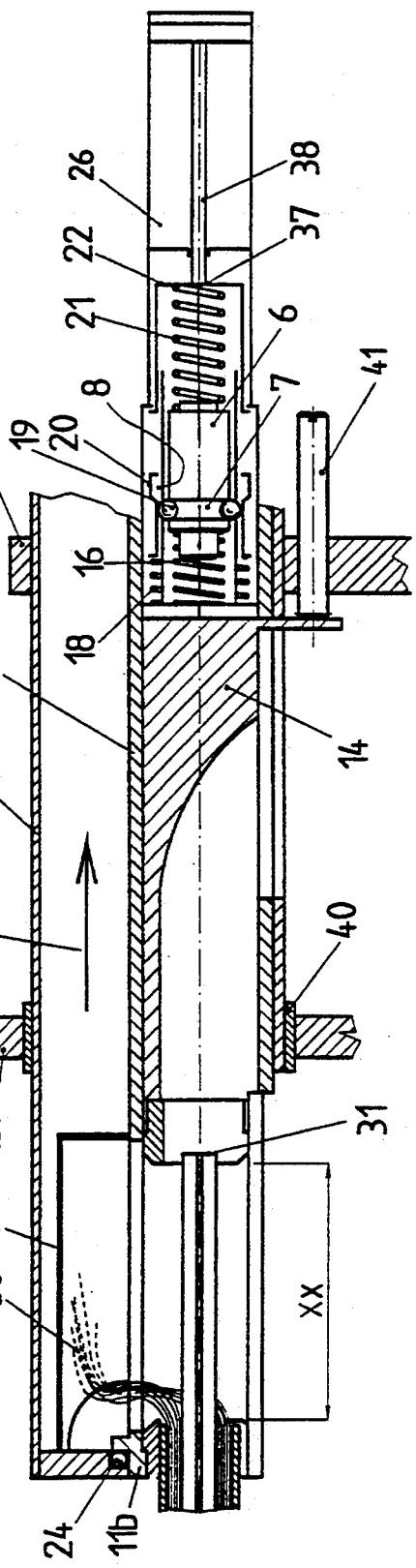
FIG. 2 shows a structure according to FIG. 1 in the open state, with the diagram of an impact drive.
Figure 8:
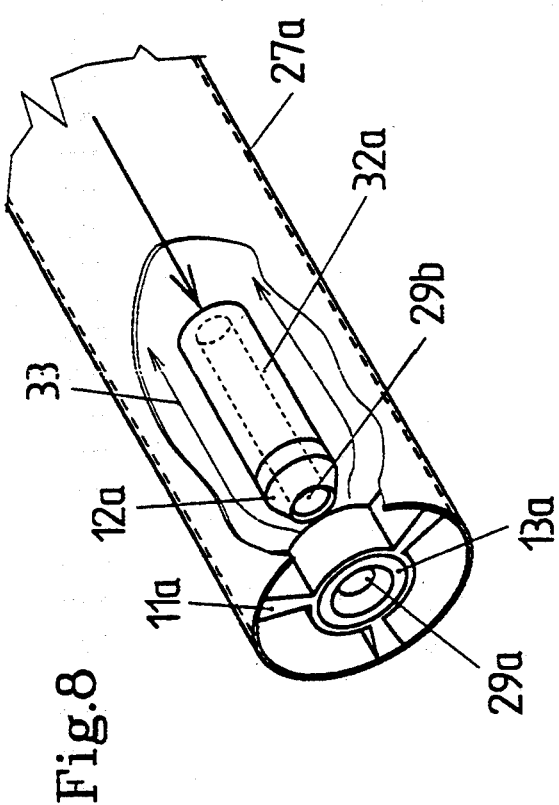
FIG. 8 shows a partially cut-away oblique view through a variant having a central insertion orifice for the cable.
Figure 7:
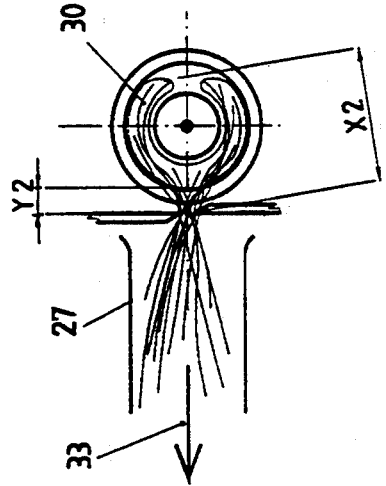
FIG. 7 shows a cutting apparatus from the prior art.
Figure 3:
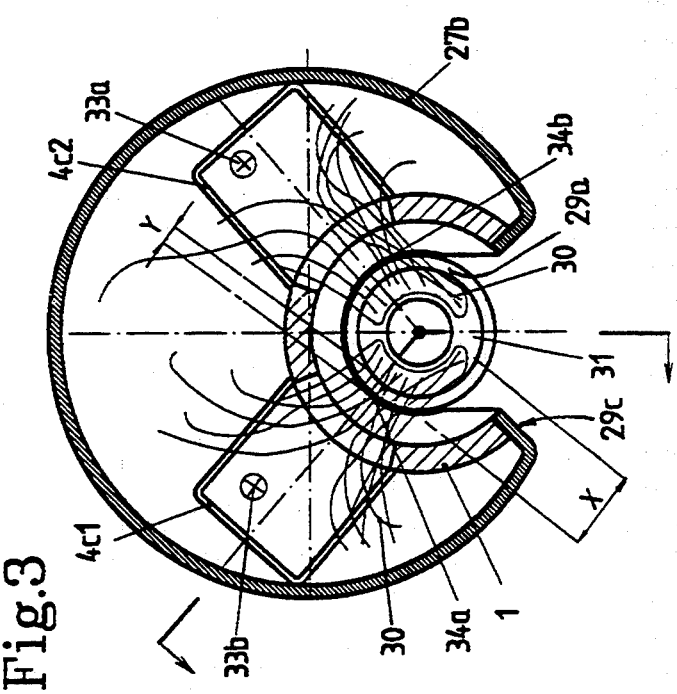
FIG. 3 shows the enlarged section along the line III—III through the embodiment according to FIG. 1.

The variants of FIG. 1 and 2 differ from the variant according to FIG. 8 in that the latter has a central insertion orifice 29a in the anvil 13a and a central insertion orifice 29b in the cutting die 12a. The insertion orifice 29a is preferably conical, so that insertion of a cable 31 is easier. The first variant of FIGS. 1–6 has a lateral insertion orifice 29c which also has a central bore, similarly to the insertion orifice 29a, 29b in FIG. 8. Since the anvil 13b and the cutting die 12b in the first variant are laterally slotted, spreading of the fibres 30 over the entire circumference of the cable sheath is not useful. In fact, no cutting will take place in the region of the slot. However, the remaining region, about 300°, offers sufficient possibility for distribution of the fibres, so that the cut-off fibre ends have a relatively uniform length. Referring to FIG. 3, the longer fibre ends which come from parts most distant from the blade 34a or 34b have a length X and the shorter ones which come from parts most close to the blade 34a or 34b have a length Y. The ratio of X to Y is substantially smaller than the ratio of X2 to Y2 illustrated in FIG. 7.

Figure 4:
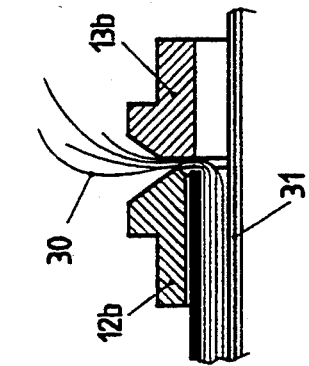
FIG. 4 shows an enlarged detail of the apparatus according to FIG. 1 with clamped fibres.

The diagram in FIG. 4 shows the fibres 30 clamped between the cutting die 12b and the anvil 13b immediately before cutting. From this position cutting occurs by narrowing the distance between the die 12b and the anvil 13b. This occurs when the impact drive 26 (FIG. 2) drive the anvil 13b towards the die 12b. The impact drive 26 may also be designed in such a way that the blade 34a, 34b does not penetrate into the surface of the anvil 13 but rather the anvil 13 stops before striking it.

Figure 6:
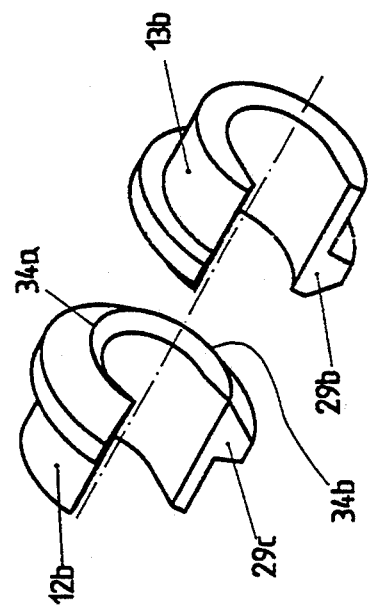
FIG. 6 shows an oblique view of a cutting die and an anvil.

The arrangement according to FIG. 6 illustrates the interchangeability of the parts 12b and 13b, and the U-shape of these for the lateral insertion of the cable.

Both parts 12b, 13b are relatively small, easily replaceable tungsten carbide parts. In FIGS. 1 and 5, 29c refers to a V-shaped insertion orifice which allows the insertion of the cable 31 according to the arrow in FIG. 5. The cable 31 is held by clamping jaws 36a and 36b respectively.

The anvil 13b is held in an anvil holder 14 (FIG. 2) which can be struck by means of a hammer 6. The hammer 6 is held under pressure in a starting position by means of a pressure spring 16. Hammer 6 and anvil holder 14 slide in a guide sleeve 1 and cannot be lost. A thrust sleeve 22 comprises a coil spring 21 which exerts a pressure on the other end of the hammer 6. The hammer 6 is positioned in the position shown by means of the springs 16 and 21. The hammer 6 has an annular groove 7 in which steel balls 19 are held by a retainer 20. The retainer 20 has a concentric groove 8 into which the steel balls 19 can move as soon as the retainer 20 is pushed forwards (to the left) by the thrust sleeve 22 against the force of a spring 18. Only in this position is the hammer 6 free to strike the anvil holder 14. The thrust sleeve 22 has a point of contact 37 with which a ram 38 makes contact. The ram 38 belongs to a fluid or electromagnetic drive 26.

The guide sleeve 1 is held in suction pipe 27b in a manner which is not shown in detail. The suction pipe 27b is closed in the front region by means of the pipe closure 10 which carries a blade holder 11b having a damper 24 into which the cutting die 12b is seated. An impact on the cutting die 12b is cushioned there. Transmission of the impact to the other parts of the apparatus is thus prevented.

The air stream 33 is divided into two part streams 33a,b by means of air guides 4c1 and 4c2 (FIG. 3). In the variant according to FIG. 8, the blade holder 11a or beads of the suction pipe 27a which are not shown may serve as air guides. The air guides 4c1 and 4c2 have a recess 17 which supports the orientation of the fibres 30. The air guides 4c1 and 4c2 are closed off at the other end so that an air intake effect occurs in the region of the recess 17.

The suction pipe 27b may be moved in axial direction. It is connected to a driver 39 which applies the moving force. For this purpose, as shown in FIG. 2, the suction pipe 27b is axially displaceable in a housing bearing 40—in a manner not shown in detail, preferably together with any further stripping stations of a stripping machine according to the invention, the bearing 40 being held in a housing 28. The displaceability is important when the apparatus according to the invention is used together with the apparatuses according to the stated copending patent application Ser. No. 07/975,263, now U.S. Pat. 5,361,384 or whenever different stripping lengths in relation to a manipulator 35 are to be provided. In many cases such a manipulator 35 is only swivelable around an axis as shown in FIG. 5 but not movable axially along this axis. The invention is not limited to a manipulator associated with the cutting apparatus as shown here in FIG. 5 and in the stated copending patent application. The axial opening movement of the anvil holder 14 is adjustable and limitable by means of a stop 41. This stop is movable with respect to the driver 39, toward the left and right in FIG. 2, for example by matching screw threads in the stop 41 and driver 39. The adjustability of the stop 41 makes it possible to preset a distance XX (FIG. 2) which approximately corresponds to the length of the cable section to be stripped. In the case of short flexible conductor ends, this is ensured by virtue of the fact that the cable ends themselves are not also picked up by the air stream 33 and moved away laterally.

The anvil 13a (FIG. 8) is fastened to blade holders 11a which transmit the impact of the cutting die 12a to the suction pipe 27a and optionally attenuate the said impact. The cutting die 12a is interchangeably held on a cutting die holder 32a. The anvil 13a and cutting die 12a are interchangeable.

The invention is not restricted by the examples described. Thus, for example, resilient rubber plates or shearing counter-blades—for example clinical shears or rounded nipping pliers—can also be provided instead of the anvil.

Further modifications are possible within the scope of the invention, and in particular measures from the stated prior art and from the stated copending patent application Ser. No. 07/975,263, each of which is regarded as having been completely disclosed herein, may be used for this purpose; thus, it is possible to provide, for example, rotating or linearly moving brushes in the direction of the cable which orient the fibre ends. An air stream then may serve only to transport away the fibres. The detailed embodiments described themselves also contain inventions which are independent of the independent Claims.

I claim:
1. Process for cutting through a cable sheathing of fibres of a fiber optical cable, comprising the steps of:
   inserting the cable laterally into a lateral orifice of a cutting tool;
   surrounding the cable with said cutting tool;
   applying a suction force and an airstream to said fibres;
   guiding said airstream in order to bring the fibres to a cutting position projecting approximately radially from said cable;
   guiding said airstream in order to distribute and position the fibres over a part of said cutting tool; and
   cutting through the fibers by supplying a cutting energy to said cutting tool; wherein the cable is inserted into the cutting tool by the steps of:
   providing a manipulator with a cable holding device;
   holding the cable with said cable holding device; and
   inserting said cable by mechanically moving said manipulator.

2. Process according to claim 1 wherein the fibres are clamped in their cutting position by said cable holding device before the cutting energy is supplied to said cutting tool.

3. Process according to claim 1 wherein after cutting through said fibres the cut fibres are removed by said suction force and said air-stream.

4. A process as in claim 1, wherein said cable holding device has a pair of clamping jaws.

5. Process for cutting through a cable sheathing of fibres of a fiber optical cable, comprising the steps of:
   inserting the cable into a lateral orifice of a cutting tool radially with respect to the axis of the cable;
   surrounding the cable with said cutting tool;
   bringing the fibres to a cutting position projecting approximately radially from said cable;
   distributing and positioning the fibres over a part of said cutting tool which lies beside said lateral orifice; and
   cutting through the fibers by supplying a cutting energy to said cutting tool; wherein the cable is inserted into the cutting tool by the steps of:

providing a manipulator with a cable holding device; holding the cable with said cable holding device and inserting said cable by mechanically moving said manipulator.

6. Process according to claim 5 wherein the fibres are clamped in their cutting position by said cable holding device before the cutting energy is supplied to said cutting tool.

7. Process according to claim 5 wherein said cutting energy is produced by an impact force.

8. Process according to claim 7 wherein said impact force is applied repetitively.

9. A process as in claim 5, wherein said cable holding device has a pair of clamping jaws.

10. Process according to claim 5 or 1 wherein the cutting energy is supplied mainly onto said part of said cutting tool which surrounds the cable by not less than 50 degrees of the circumference of the cable.

11. Process according to claim 5 or 1 wherein the cutting energy is supplied mainly onto said part of said cutting tool which surrounds the cable by not less than 100 degrees of the circumference of the cable wherein said 100 degrees are split into two regions on said cutting tool.

12. Process according to claim 5 or 1 wherein the cutting force is supplied mainly onto said part of said cutting tool which surrounds the cable by not less than 180 degrees of the circumference of the cable wherein said 180 degrees are split into two regions on said cutting tool.

13. Apparatus for cutting through a cable sheathing of fibres of a cable, comprising:
a housing;
a suction pipe connected to said housing;
a cutting tool connected to said housing and movably held within said suction pipe;
said cutting tool having a lateral orifice for inserting said cable;
an air guide for channeling a suction force and an air stream from said suction pipe to said fibres when said cable is inserted into said cutting tool;
a fibre guide arrangement for guiding said air stream so as to distribute and position the fibres in a cutting position projecting approximately radially from said cable and over a part of said cutting tool;
means for providing a cutting force onto said cutting tool when said fibres are in position; and
said suction pipe having a lateral orifice corresponding to said lateral orifice in said cutting tool in order to allow an insertion of said cable into said cutting tool radially with respect to the axis of the cable.

14. Apparatus of claim 13 further comprising clamping means for clamping said fibres in their cutting position.

15. Apparatus of claim 13 wherein said cutting tool has at least two cutting zones, and said fibre guide arrangement guides said air stream in order to position the fibres over said at least two cutting zones.

16. Apparatus of claim 13 further comprising a manipulator associated with said cutting apparatus, said manipulator comprising clamping jaws for clamping said cable; said manipulator being adapted to insert said cable laterally into said lateral orifice of said cutting tool.

17. Apparatus of claim 13 wherein said cutting tool comprises an anvil and a cutting die, said anvil and cutting die having a U-shaped cross section.

18. Apparatus of claim 17 wherein said cutting die has a cutting blade which is approximately V-shaped when viewed in section, said V having an opening angle of approximately 90 degrees.

19. Apparatus of claim 13 wherein said means for providing a cutting force comprise a pressure drive.

20. Apparatus of claim 13 wherein said means for providing a cutting force comprise an impact drive.

21. Apparatus of claim 20 wherein said impact drive is held elastically with respect to said housing.

22. Apparatus of claim 20, further comprising means for holding said impact drive elastically under springload within said suction pipe.

23. Apparatus of claim 20 wherein said impact drive comprises impact damping means which are mounted within said suction pipe.

24. Apparatus of claim 20 wherein said impact drive comprises a fluidically or electromagnetically operable hammer.

25. Apparatus of claim 24, further comprising means for moving said hammer in a repetitive manner for applying the cutting force onto said cutting tool.

26. Apparatus of claim 13 wherein said cutting tool comprises anvil means and cutting die means which are movable toward and away from each other, and said apparatus has means to stop such movement of said anvil means away from said cutting die means.

* * * * *